United States Patent
Kuczek et al.

(10) Patent No.: US 11,926,109 B2
(45) Date of Patent: Mar. 12, 2024

(54) METHOD OF MANUFACTURING A COMPOSITE VESSEL ASSEMBLY

(71) Applicant: RTX CORPORATION, Farmington, CT (US)

(72) Inventors: Andrzej Ernest Kuczek, Bristol, CT (US); Ellen Y. Sun, South Windsor, CT (US); Wenping Zhao, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 953 days.

(21) Appl. No.: 16/095,587

(22) PCT Filed: Apr. 22, 2016

(86) PCT No.: PCT/US2016/028937
§ 371 (c)(1),
(2) Date: Oct. 22, 2018

(87) PCT Pub. No.: WO2017/184171
PCT Pub. Date: Oct. 26, 2017

(65) Prior Publication Data
US 2020/0353704 A1 Nov. 12, 2020

(51) Int. Cl.
*B29C 70/42* (2006.01)
*B29C 33/52* (2006.01)
(Continued)

(52) U.S. Cl.
CPC .............. *B29C 70/42* (2013.01); *B29C 33/52* (2013.01); *B29C 33/54* (2013.01); *B29C 70/345* (2013.01);
(Continued)

(58) Field of Classification Search
CPC ......... B29C 70/84; B29C 33/52; B29C 33/54; B29C 70/345; B29C 70/46; B29C 70/682;
(Continued)

(56) References Cited

U.S. PATENT DOCUMENTS 2,517,902 A * 8/1950 Luebkeman ........ B29C 33/3821
264/221
2,998,501 A * 8/1961 Edberg .................. B29C 44/304
219/772

(Continued)

FOREIGN PATENT DOCUMENTS

DE 102005056420 A1 5/2007
FR 2971448 A1 8/2012
(Continued)

OTHER PUBLICATIONS

ISR/WO, Issued Jan. 20, 2017 for related International Application No. PCT/US2016/028937; 12 pages.

*Primary Examiner* — Jacob T Minskey
*Assistant Examiner* — Caroline Beha
(74) *Attorney, Agent, or Firm* — CANTOR COLBURN LLP (57) ABSTRACT

A method of manufacturing a composite vessel assembly (20) includes the steps of filling a first chamber defined by a first liner (28,30,32) with a first granulated material (96) through a first orifice (98) in the first liner. A vacuum is then applied to the first chamber, and the first orifice is plugged. The first liner may then be enveloped with a first layer (84) for structural rigidity followed by relief of the vacuum.

17 Claims, 10 Drawing Sheets

(51) Int. Cl.
*B29C 33/54* (2006.01)
*B29C 70/34* (2006.01)
*B29C 70/68* (2006.01)
*B29C 70/70* (2006.01)
*B29C 70/84* (2006.01)
*F17C 1/06* (2006.01)
*F17C 1/16* (2006.01)
*B29L 31/00* (2006.01)

(52) U.S. Cl.
CPC ............ *B29C 70/682* (2013.01); *B29C 70/70* (2013.01); *B29C 70/84* (2013.01); *F17C 1/06* (2013.01); *F17C 1/16* (2013.01); *B29L 2031/7156* (2013.01); *F17C 2201/0152* (2013.01); *F17C 2203/0604* (2013.01); *F17C 2203/0621* (2013.01); *F17C 2203/0663* (2013.01); *F17C 2209/232* (2013.01)

(58) Field of Classification Search
CPC ......... B29C 70/70; B29C 70/42; B29C 70/32; B29C 33/3821; B29C 33/50; B29C 33/505; B29C 49/0031; F17C 1/06; F17C 1/16; F17C 2201/0152; F17C 2203/0604; F17C 2203/0621; F17C 2203/0663; F17C 2209/232; F17C 2201/056; F17C 2203/0607; F17C 2203/0636; F17C 2203/066; F17C 2203/0695; F17C 2209/225; F17C 2209/234; F17C 2221/012; F17C 2221/031; F17C 2221/033; F17C 2221/035; F17C 2223/0123; F17C 2223/0153; F17C 2223/033; F17C 2223/036; F17C 1/02; F17C 1/14; B29L 2031/7156; Y02E 60/32
See application file for complete search history.

(56) References Cited

U.S. PATENT DOCUMENTS

| | | | | |
|---|---|---|---|---|
| 3,368,708 | A * | 2/1968 | Pflederer | B65D 90/029 |
| | | | | 220/590 |
| 3,993,811 | A * | 11/1976 | Walles | F17C 13/001 |
| | | | | 428/35.9 |
| 4,374,080 | A * | 2/1983 | Schroeder | B29C 33/301 |
| | | | | 264/102 |
| 5,076,880 | A * | 12/1991 | Spengler | B29C 51/16 |
| | | | | 156/382 |
| 5,577,630 | A * | 11/1996 | Blair | B60K 15/03006 |
| | | | | 220/581 |
| 10,670,186 | B1 * | 6/2020 | Rauscher | B29C 70/68 |
| 2003/0232176 | A1 * | 12/2003 | Polk, Jr. | B29C 48/2556 |
| | | | | 428/167 |
| 2004/0188449 | A1 * | 9/2004 | Thompson | F17C 1/00 |
| | | | | 220/723 |
| 2006/0138692 | A1 * | 6/2006 | Suzuki | C08J 9/0061 |
| | | | | 264/46.6 |
| 2007/0062959 | A1 * | 3/2007 | Sneddon | F17C 1/06 |
| | | | | 156/289 |
| 2011/0210475 | A1 * | 9/2011 | Strack | B29C 49/02 |
| | | | | 264/254 |
| 2013/0025775 | A1 | 1/2013 | Wan et al. | |
| 2014/0295124 | A1 * | 10/2014 | Suhara | B29C 73/10 |
| | | | | 428/63 |

FOREIGN PATENT DOCUMENTS

| | | |
|---|---|---|
| JP | 59067007 A * 4/1984 | ......... B29C 33/3821 |
| WO | 2016057024 A1 4/2016 | |

* cited by examiner

METHOD OF MANUFACTURING A COMPOSITE VESSEL ASSEMBLY

STATEMENT REGARDING FEDERALLY SPONSORED RESEARCH OR DEVELOPMENT

This invention was made with Government support under Agreement DE-AR0000254 for ARPA-E Low Cost Hybrid Materials and Manufacturing for Conformable CNG Tank. The Government has certain rights in the invention.

CROSS-REFERENCE TO RELATED APPLICATIONS

This application claims the benefit of PCT/US2016/028937 filed Apr. 22, 2016, which is incorporated herein by reference in its entirety.

BACKGROUND

The present disclosure relates to a vessel assembly and more particularly to a method of manufacturing the vessel assembly with a thin-walled liner.

Pressure vessels may serve as storage media (e.g., gas) for a wide variety of consumer, commercial, and industrial processes. In order to store sufficient mass of gas for any operation within a given volume, the gas is stored at high pressure. Traditionally, pressure vessels have a typical spherical or cylindrical design that evenly distributes stress in the containment perimeter. Unfortunately, such tanks do not use allocated space efficiently. For example, a spherical vessel fills a cubic space with about fifty-two percent efficiency, and a cylindrical vessel fills a rectangular volume with approximately seventy percent efficiency. More recent improvements in pressure vessels that generally conform to a rectangular volume may fill the space with about ninety percent efficiency relative to a true rectangular volume.

The designs of non-spherical/cylindrical pressure vessels to support high internal pressure are complex, including variable-curvature external surfaces and internal structure to transfer mechanical loads. The large size of a high conformable vessel and the complicated shapes makes manufacturing challenging. In addition, manufacturing needs to consistently provide reliable, high-volume, lightweight and low-cost constructions.

SUMMARY

A method of manufacturing a composite vessel assembly according to one, non-limiting, embodiment of the present disclosure includes filling a first chamber defined by a first liner with a first granulated material through a first orifice in the first liner; applying a vacuum to the first chamber; plugging the first orifice; enveloping the first liner with a first layer for structural rigidity; and relieving the vacuum.

Additionally to the foregoing embodiment, the vacuum is relieved through the first orifice by unplugging the first orifice.

In the alternative or additionally thereto, in the foregoing embodiment, the method includes placing the first liner in a first pre-form fixture prior to filling with the first granulated material.

In the alternative or additionally thereto, in the foregoing embodiment, the method includes removing the first liner from the first pre-form fixture before enveloping the liner with the first layer.

In the alternative or additionally thereto, in the foregoing embodiment, the first layer is a composite layer.

In the alternative or additionally thereto, in the foregoing embodiment, the method includes curing the first layer before relieving the vacuum.

In the alternative or additionally thereto, in the foregoing embodiment, the method includes removing the first granulated material through the first orifice.

In the alternative or additionally thereto, in the foregoing embodiment, the method includes removing the first granulated material is performed by dissolving the first granulated material.

In the alternative or additionally thereto, in the foregoing embodiment, the first liner is made of a polymer and the first layer is made of a resin impregnated fiber-based material.

In the alternative or additionally thereto, in the foregoing embodiment, the first granulated material is a gas absorbent material.

In the alternative or additionally thereto, in the foregoing embodiment, the method includes filling a second chamber defined by a second liner with a second granulated material through a second orifice in the second liner; applying a vacuum to the second chamber; plugging the second orifice; enveloping the second liner with a second layer for structural rigidity; relieving the vacuum; and enveloping the first and second layers with a third layer.

In the alternative or additionally thereto, in the foregoing embodiment, a portion of the first and second layers are placed in direct contact with one-another before the first and second layers are enveloped by a third layer.

In the alternative or additionally thereto, in the foregoing embodiment, the method includes placing the second liner in a second pre-form fixture prior to filling with the second granulated material.

In the alternative or additionally thereto, in the foregoing embodiment, the method includes removing the second liner from the second pre-form fixture before enveloping with the second layer.

In the alternative or additionally thereto, in the foregoing embodiment, the first and second layers are made of a resin-based composite material.

In the alternative or additionally thereto, in the foregoing embodiment, the method includes curing the first and second layers before relieving the vacuums from the first and second chambers.

In the alternative or additionally thereto, in the foregoing embodiment, the first and second layers are enveloped by the third layer before the first and second layers are cured.

In the alternative or additionally thereto, in the foregoing embodiment, the third layer is a resin-based composite material.

In the alternative or additionally thereto, in the foregoing embodiment, the method includes removing the first and second granulated materials through the respective first and second orifices.

A method of manufacturing a composite vessel assembly according to another, non-limiting, embodiment includes filling a first chamber defined by a liner with a granulated material through an orifice in the liner; and enveloping the liner with a layer for structural rigidity.

The foregoing features and elements may be combined in various combinations without exclusivity, unless expressly indicated otherwise. These features and elements as well as the operation thereof will become more apparent in light of the following description and the accompanying drawings.

However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The detailed description explains embodiments of the invention, together with advantages and features, by way of example with reference to the drawings.

DETAILED DESCRIPTION OF THE INVENTION

Figure 1:
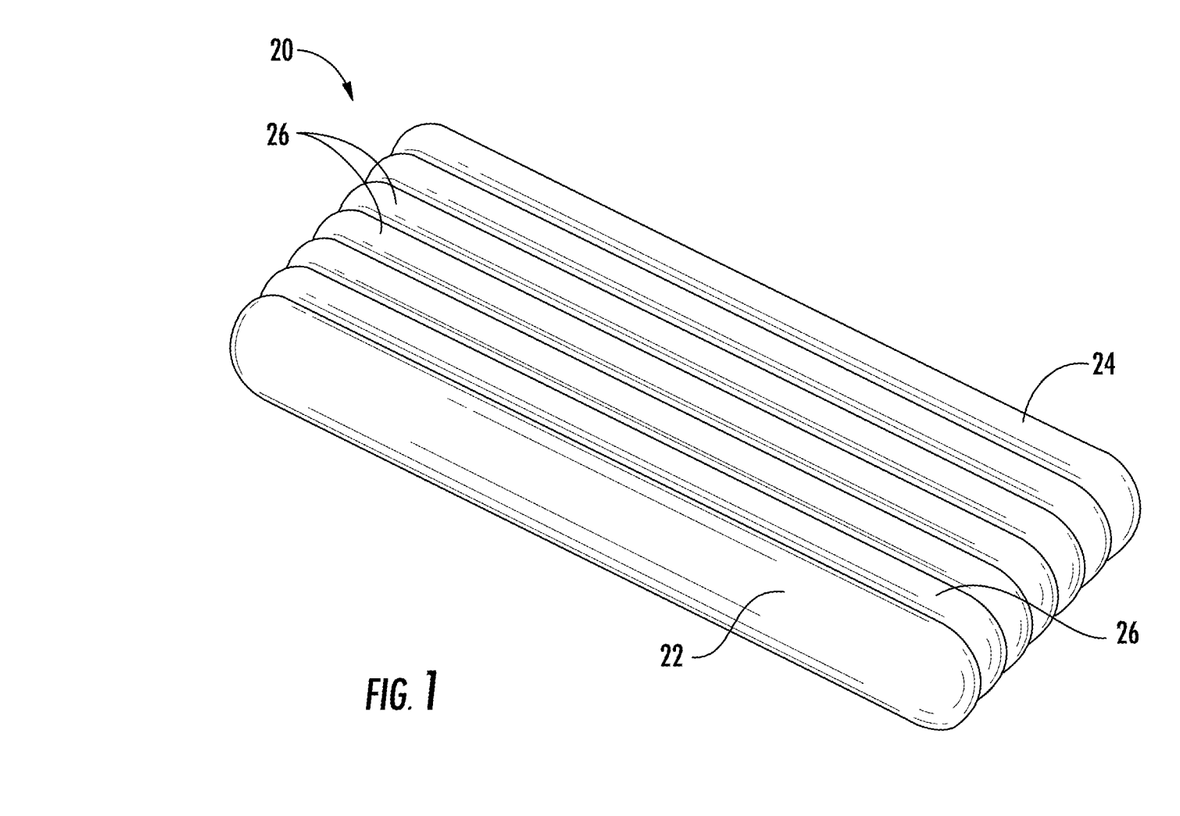
FIG. 1 is a perspective view of a vessel assembly configured to store a pressurized fluid according to an exemplary embodiment of the invention.

Referring now to FIG. 1, an example of a vessel or tank assembly 20 may be configured to store a high pressure fluid as illustrated. Exemplary fluids that may be stored within the pressure vessel assembly 20 include, but are not limited to, compressed natural gas (CNG), hydrogen, propane, methane, air, and hydraulic fluid, for example. The vessel assembly 20 may generally include two flanking vessels 22, 24 and at least one interior vessel 26 (e.g., five identical interior vessels illustrated) joined to and disposed between the flanking vessels 22, 24. Each vessel 22, 24, 26 may generally be elongated with the overall configuration of the vessel assembly 20 generally being a rectangular shape, but as will be appreciated from the description, herein, other shapes are contemplated. It is further contemplated and understood that some applications of the present disclosure may include vessel assemblies 20 that are not under significant pressure, and that may include only one interior vessel.

Figure 2:
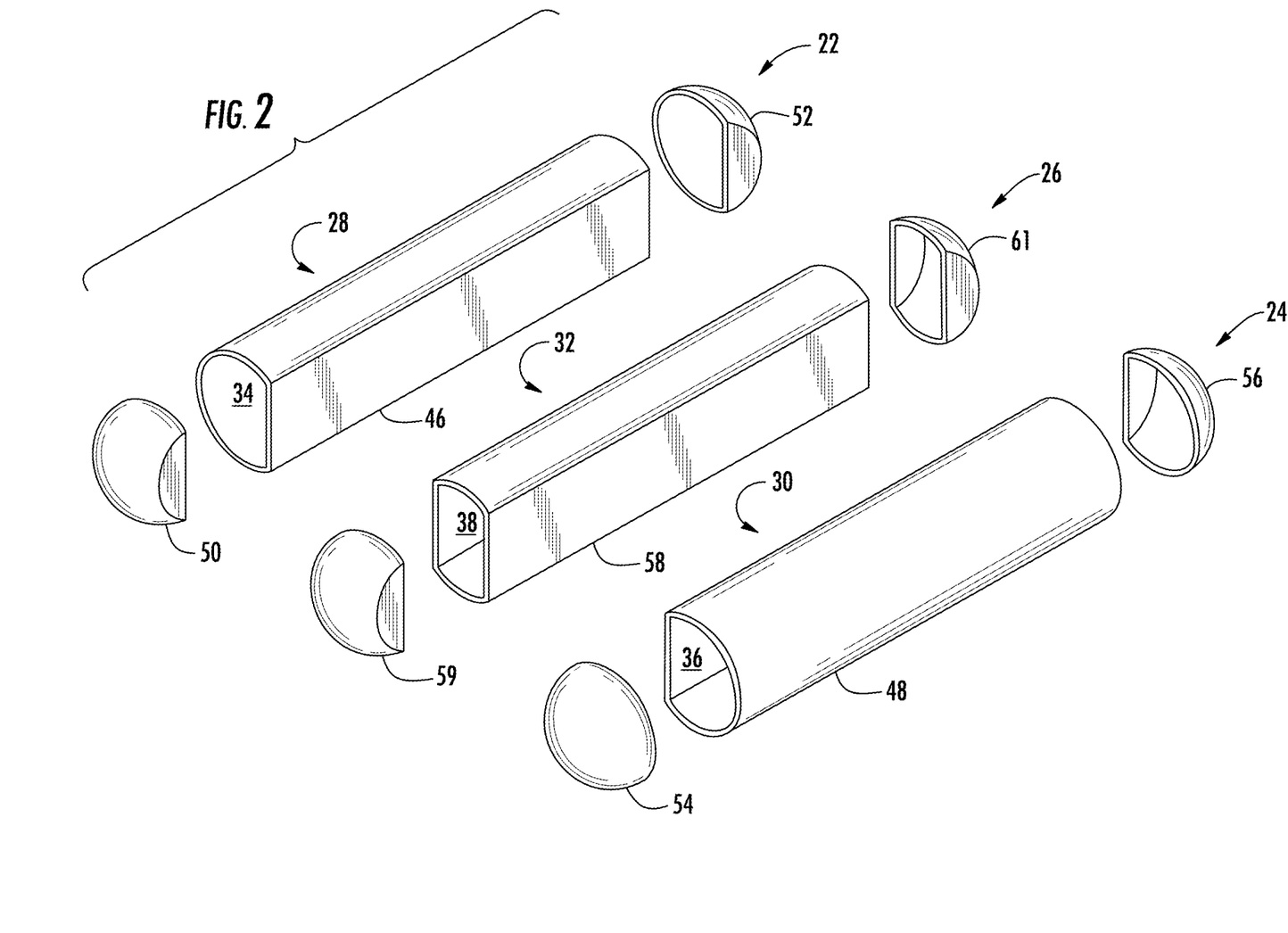
FIG. 2 is an exploded perspective view of liners of the vessel assembly.
Figure 3:
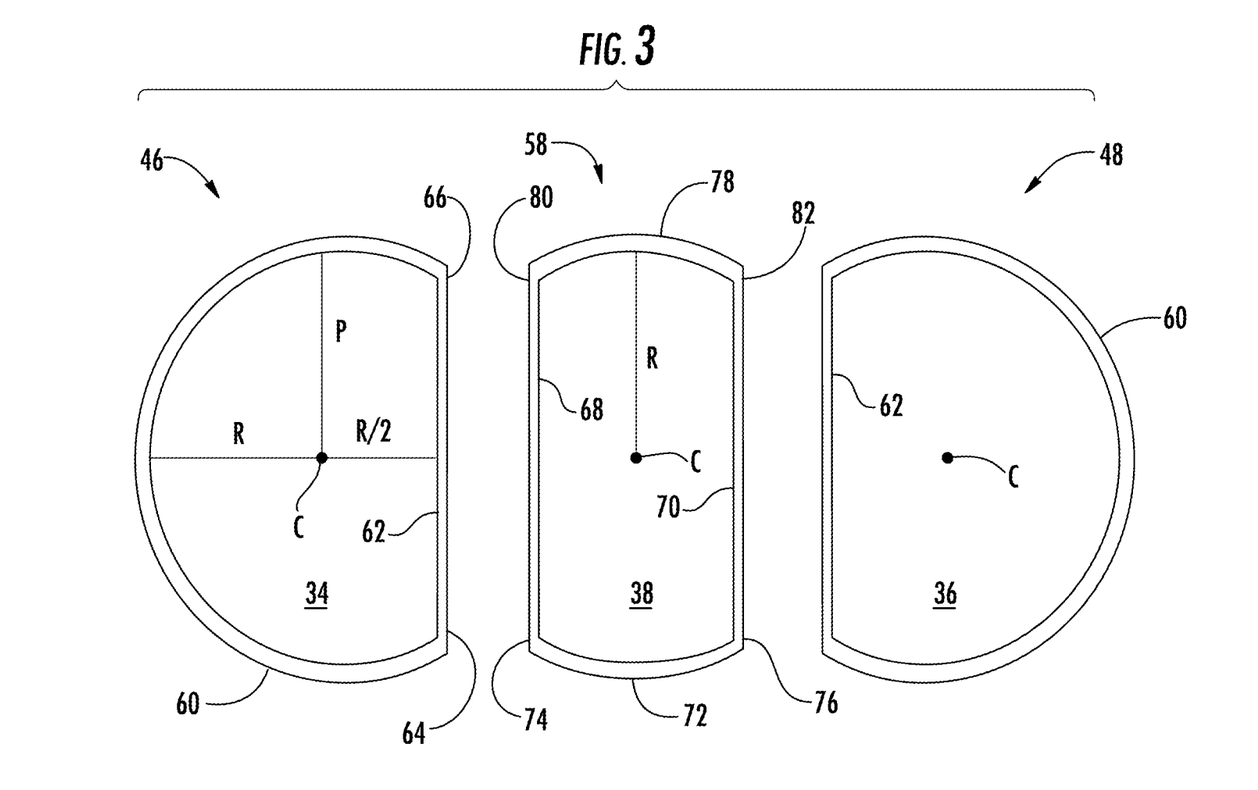
FIG. 3 is a cross section of the liners.

Referring to FIGS. 2 and 3, each vessel 22, 24, 26 may include respective liners 28, 30, 32. Each liner 28, 30, 32 may define the boundaries of respective chambers 34, 36, 38 for fluid storage. Although not shown, the chambers 34, 36, 38 may be in fluid communication with adjacent chamber(s). The flanking end liners 28, 30 may include respective lobes 46, 48 with lobe 46 closed-off by opposite end caps 50, 52, and lobe 48 closed-off by opposite end caps 54, 56. Each lobe 46, 48 may be circumferentially continuous and substantially cylindrical. The interior liner 32 may include a lobe 58 with the lobe 58 closed-off by opposite end caps 59, 61. Lobe 58 may be circumferentially continuous. It is further contemplated and understood that the liners 28, 30, 32 may take the form of any shape that defines the boundaries of an internal chamber capable of storing a fluid.

The liners 28, 30, 32 may be a contoured bladder having a minimal wall thickness. The liners 28, 30, 32 may be made of any material and wall thickness capable of preventing or minimizing stored gas or fluid permeation through the wall, minimizing weight, reducing costs, and meeting other parameters necessary for a particular application. Examples of liner material may include a metallic foil-like composition, plastic (e.g., thermoplastic, thermoset, and other polymer materials), elastomeric material, and other resilient liner materials. The liners 28, 30, 32 may be manufactured by any variety of techniques including blow molded plastic, injection molded plastic, and others. It is further contemplated and understood that the liners 28, 30, 32 may not have the necessary structural integrity to maintain a pre-formed shape either standing on their own, or, during a manufacturing process that adds or envelopes the liners with an additional layer that may be a composite material for structural strength.

Referring to FIG. 3, the lobes 46, 48 of the respective flanking liners 28, 30 may be substantially identical and are arranged such that the lobe 46 of the first flanking liner 28 is rotated about one-hundred and eighty (180) degrees relative to the lobe 48 of the opposite flanking liner 30 (i.e., are arranged as a mirror image of one-another). Each flanking lobe 46, 48 may include a generally cylindrical outer portion or wall 60 and an interior portion or wall 62. The interior wall 62 may be substantially planar and may laterally span between a first end 64 and a second end 66 of the cylindrical outer wall 60. In one embodiment, the interior wall 62 is integrally formed with the ends 64, 66 of the cylindrical outer wall 60. At least a portion of the curvature of the cylindrical outer wall 60 is defined by a radius R. In one embodiment, the portion of the outer wall 60, opposite the interior wall 62, includes a circular shape or curve generally spanning about two-hundred and forty (240) degrees with the radius R and about a centerline C. Consequently, the overall height of the flanking lobes 46, 48 is equal to double the length of the radius R of the cylindrical outer wall 60. The interior wall 62 (i.e., disposed vertically per the landscape illustrative perspective of FIG. 3) is generally parallel to and spaced apart from a vertical plane P that includes the origin of the radius R that defines the curvature of the outer wall 60. In one embodiment, the distance between the interior wall 62 and the parallel vertical plane P is about half the length of the radius R if the Y-joint is about one-hundred and twenty (120) degrees. As a result, the flanking lobes 46, 48 generally have a width equal to about one and a half the length of the radius of curvature R of the outer wall 60.

The illustrated interior lobe 58 includes first and second interior sidewalls 68, 70 that may be diametrically opposite one another, substantially vertically arranged (i.e., per the landscape illustrative perspective of FIG. 3), and separated from one another by a distance. In one embodiment, the width of the interior lobe 58 is generally equal to the radius of curvature R of the end lobes 46, 48. The thicknesses of the first interior sidewall 68 and the second interior sidewall 70 may be identical and may be equal to the thickness of the interior wall 62 of the flanking lobes 46, 48. A first outside wall 72 extends between a first end 74 of the first interior sidewall 68 and a first end 76 of the second interior sidewall 70. Similarly, a second outside wall 78 extends between a second end 80 of the first interior sidewall 68 and a second end 82 of the second interior sidewall 70.

The curvature of the first outside wall 72 and the second outside wall 78 may be defined by a circular shape or curve generally of a sixty (60) degree angle by a radius R. In one embodiment, the radius of curvature R of the interior lobe 58 is substantially identical to the radius of curvature R of the flanking lobes 46, 48. Consequently, the distance between the first curved wall 72 and the second curved wall 78 is double the length of the radius of curvature R, and is therefore, substantially equal to the height of the flanking lobes 46, 48.

Figure 4:
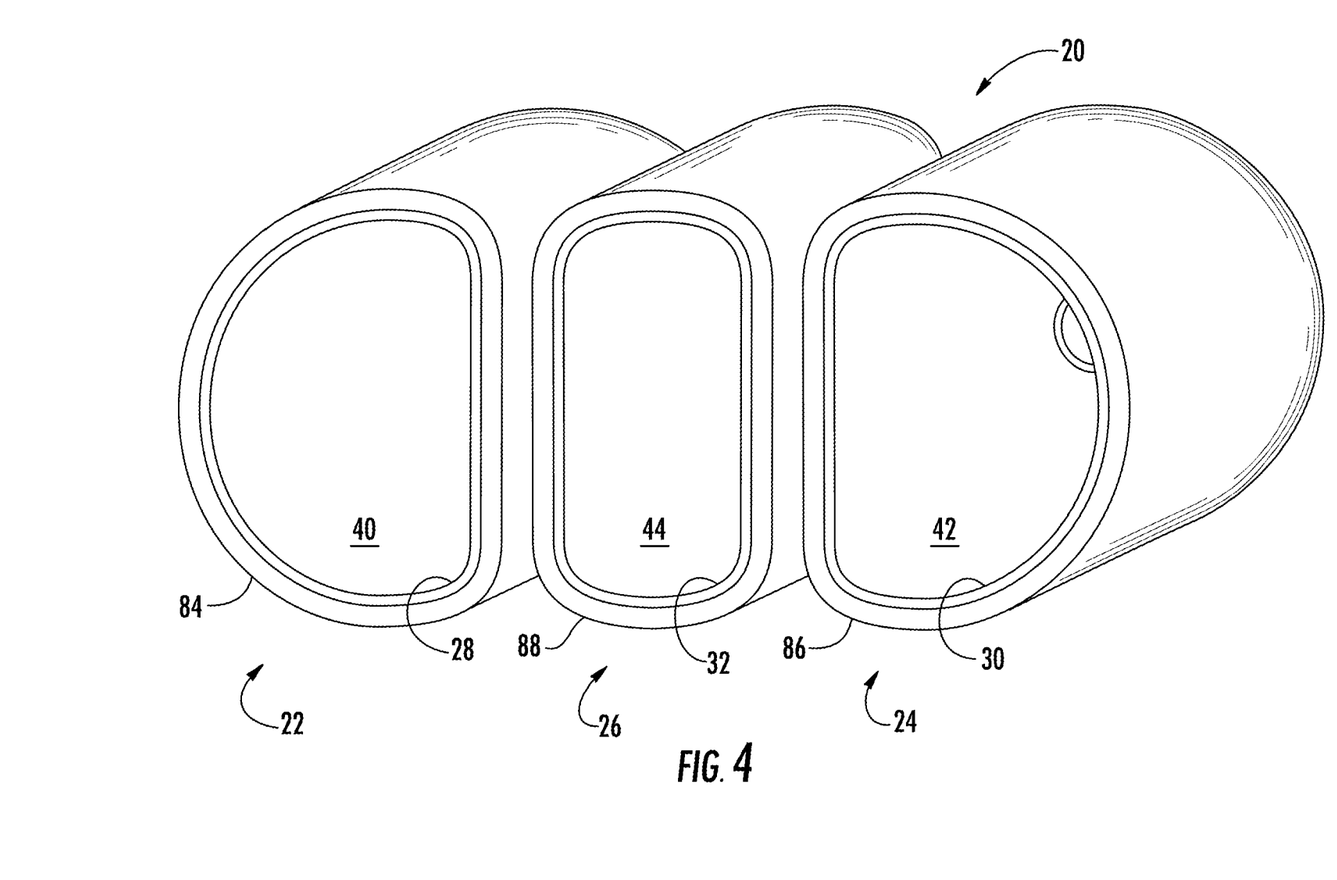
FIG. 4 is a perspective cross section of the liners with an inner-layer applied.

Referring to FIG. 4, the vessels 22, 24, 26 may include respective inner-layers 84, 86, 88 that substantially cover the respective liners 28, 30, 32. The inner-layers 84, 86, 88 may be a composite, and may be a continuous fiber wrapping or prepregs (i.e., fiber with resin) wrapped about the lobes and end caps of the liners for structural strength and for distributing internal stress. Alternatively, the inner-layers 84, 86, 88 may include a braiding that wraps about the respective liners 28, 30, 32, or may be a resin impregnated chopped fiber that may be spray applied. The primary reinforcement (i.e., the fibers or braiding), may be made of a carbon fiber, a glass fiber or an aramid fiber. A matrix material or resin for binding the continuous fibers may include epoxy, vinyl ester, urethane, and other resin systems that may be nano-enhanced. It is further contemplated and understood that the inner-layers 84, 86, 88 may comprise other materials and/or processes including automated fiber placement, winded filaments, and/or a mixture of continuous and non-continuous fiber.

When the composite vessel assembly 20 is at least partially assembled, the interior wall 62 of the flanking lobe 46 is opposed and in proximity to the interior sidewall 68 of the interior lobe 58. The portion of the inner-layer 84 covering the interior wall 62 may be directly adjacent to the portion of the inner-layer 88 that covers the sidewall 68. Moreover, the portion of the inner-layer 84 covering the interior wall 62 may be adhered to the portion of the inner-layer 88 that covers the sidewall 68 if, for example, prepreg is applied. Similarly, the interior wall 62 of the flanking lobe 48 is opposed and in proximity to the interior sidewall 70 of the interior lobe 58. The portion of the inner-layer 86 covering the interior wall 62 may be directly adjacent and adhered to the portion of the inner-layer 88 that covers the sidewall 70.

Figure 5:
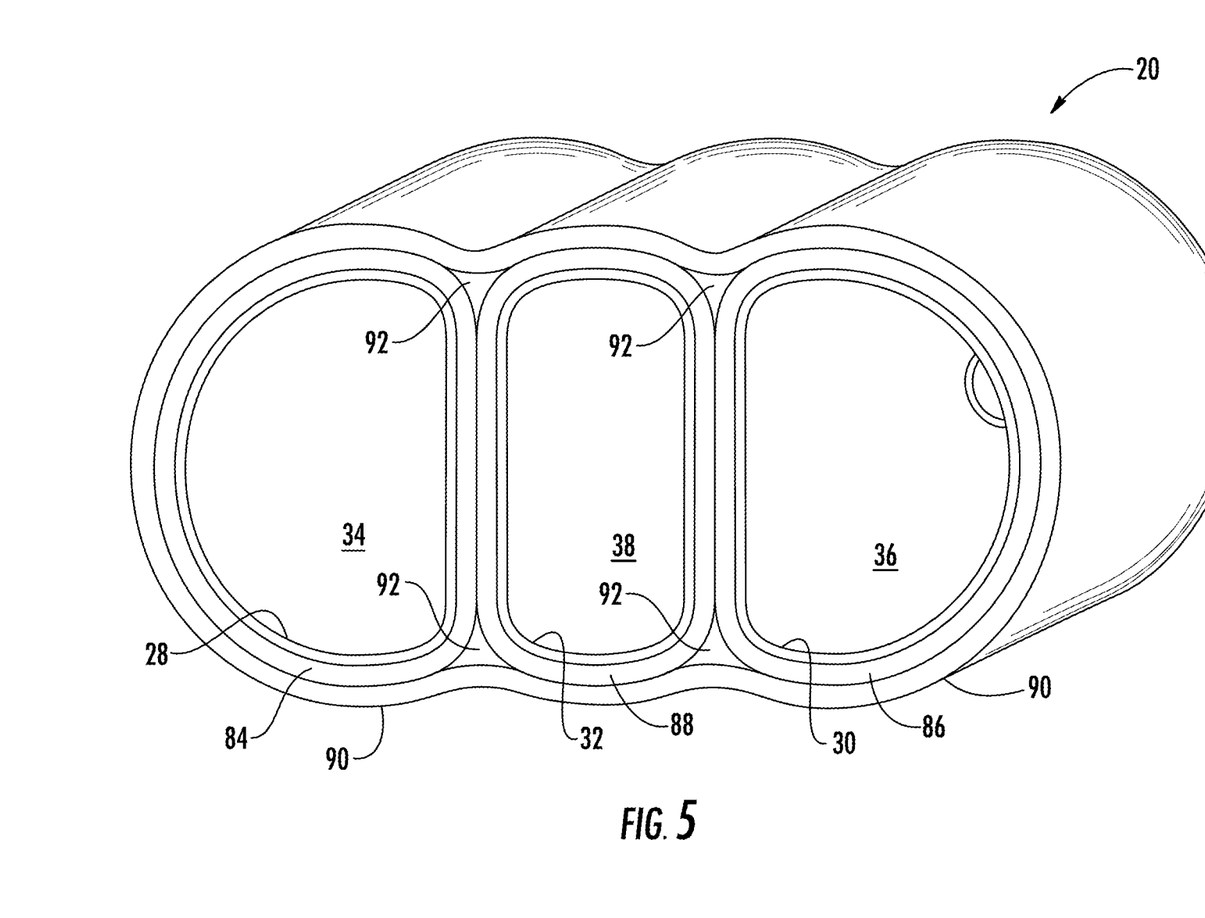
FIG. 5 is a perspective cross section of the vessel assembly.

Referring to FIG. 5, the composite vessel assembly 20 may include an outer layer 90 that generally covers and envelops the inner-layers 84, 86, 88. The outer layer 90 may be applied after the inner-layers 84, 86, 88 are joined. The outer layer 90 may be a composite, and may be a mixture of a non-continuous (e.g., chopped) fiber and resin that may be spray applied (i.e., spray chopped fiber/resin) or may be a sheet molding compound (SMC). The primary reinforcement (i.e., the chopped fibers), may be made of a carbon fiber, a glass fiber or an aramid fiber of about one (1) inch in length (2.5 cm). The resin for binding the chopped fibers may include epoxy, vinyl ester, urethane, and other resin systems that may be nano-enhanced.

The composite vessel assembly 20 may further include a plurality of junctions 92 with each junction located where respective ends of the outer walls 60, 72, 78, ends of the sidewalls 68, 70, and ends of interior walls 62 generally meet (also see FIG. 3). Each junction 92 may be generally triangular in cross section, and may generally be located at a center of a Y-shaped seam (i.e., where the inner and outer layers adhere to one another). The junction 92 may be made of the same material as the outer layer 90. When the vessels 22, 24, 26 are under internal pressure, areas proximate to and/or at the junctions 92 are designed to withstand significant through-thickness tensile stress that would otherwise challenge layered composite structures.

In one embodiment where continuous fiber is utilized for the inner-layers 84, 86, 88 and the chopped fiber is used for the outer layer 90, the vessel assembly 20 may be much lighter in weight than if the entire assembly were made with a chopped fiber. However, the internal structural sidewalls 68, 70 and internal walls 62 may have different thicknesses (e.g., about half as thick) than the outer walls 60, 72, 78 with the hybrid of continuous fiber and chopped fiber. For this embodiment of hybrid composite wall construction, the internal structural sidewalls 68, 70 and internal walls 62 may have a higher or lower effective stiffness than the hybrid outer walls 60, 72, 78, and therefore the junctions 92 will require an optimized angle that is different from about one-hundred and twenty (120) degrees that would typically be derived from homogeneous materials. The junction 92 angle and the internal wall thickness can be optimized based on specific material properties and hybrid wall construction.

Figure 6:
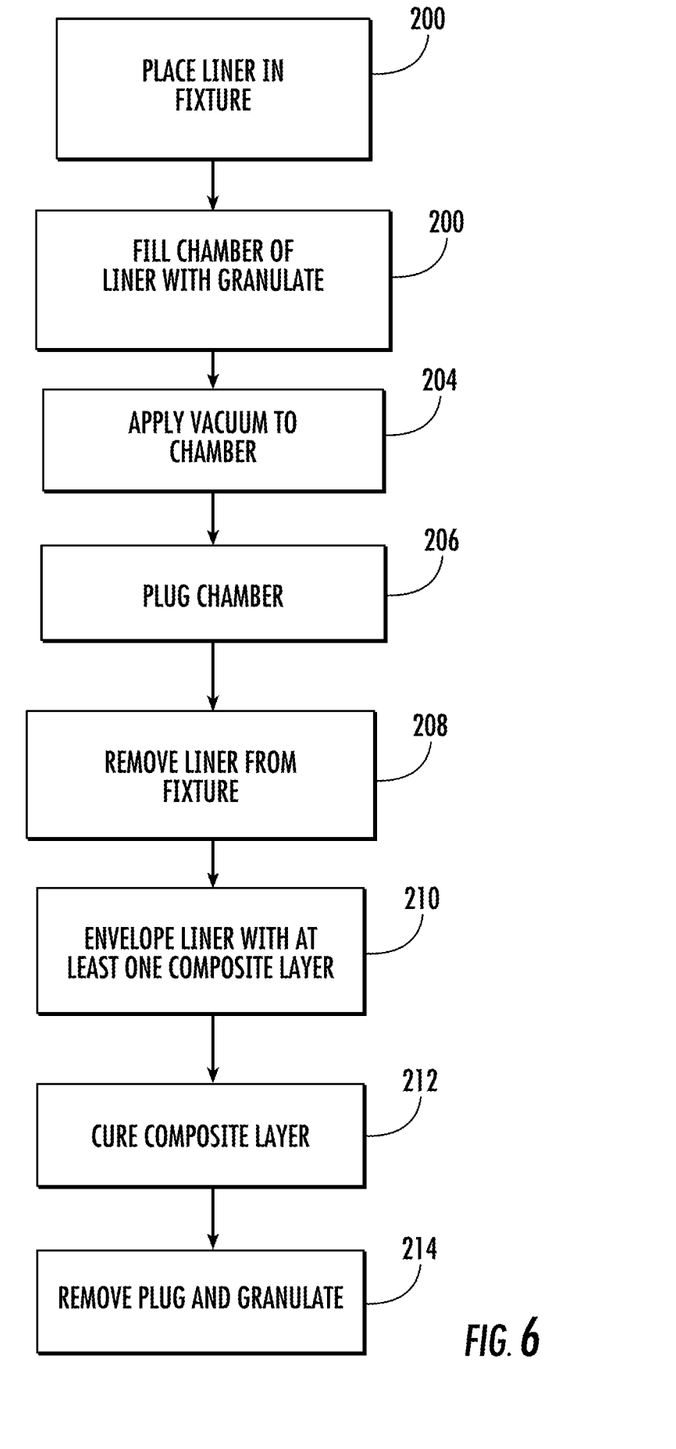
FIG. 6 is a flow chart on a method of manufacturing the vessel assembly with a single liner.
Figure 7:
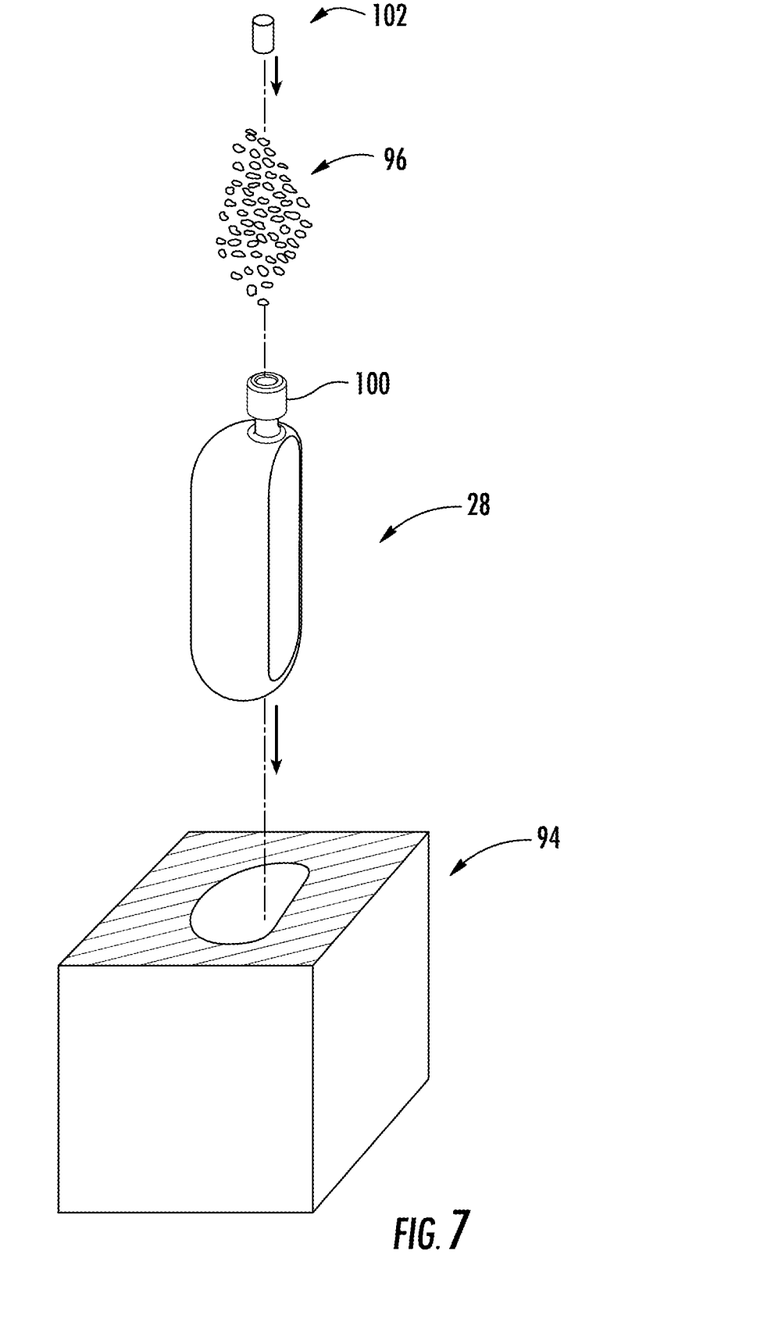
FIG. 7 is an exploded perspective view of a pre-form fixture and granulated material used during the method of manufacturing.
Figure 8:
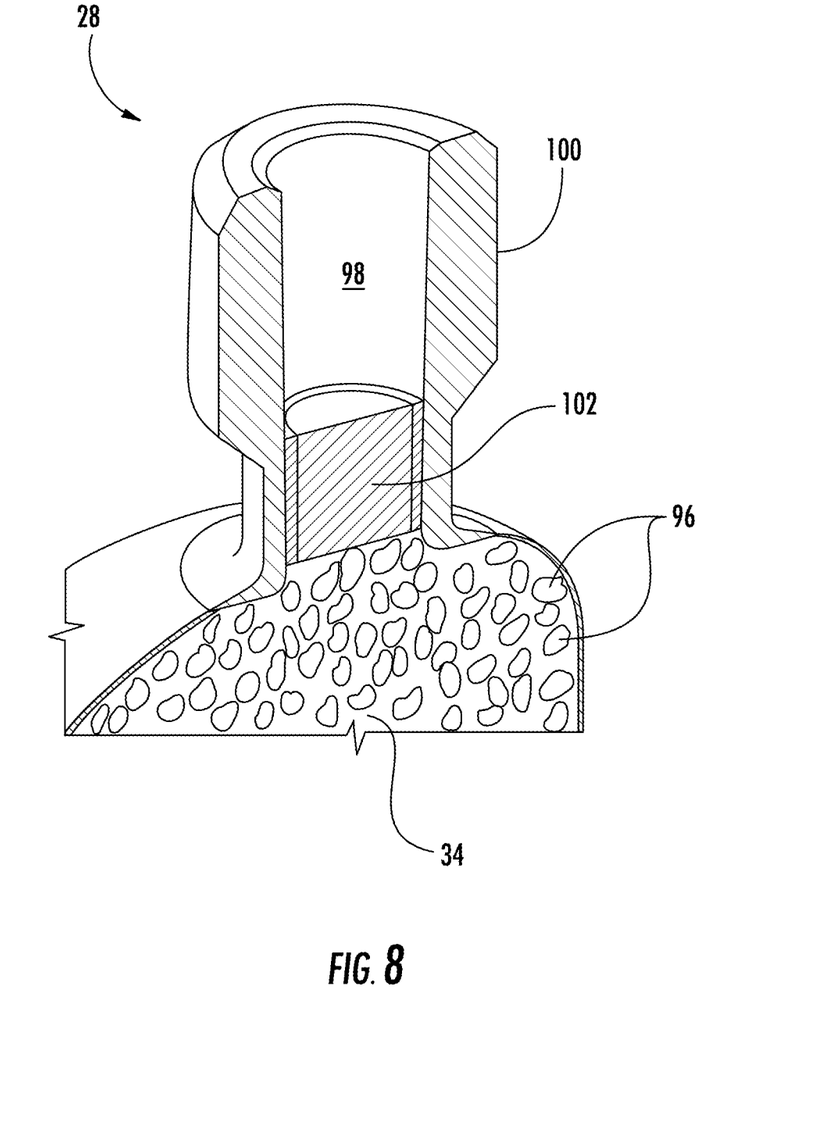
FIG. 8 is a partial perspective cross section of the vessel assembly when under a vacuum during the method of manufacturing.

Referring to FIGS. 6 through 8, a method of manufacturing the vessel assembly 20 is illustrated. In block 200, the liner 28 (which may be fully manufactured) may be placed in a pre-form fixture 94 that generally conforms to the outer contours of the liner 28 when fully expanded to the intended/desired shape. In block 202, the liner 28 may then be filled with a granulated material 96 through an orifice 98 defined by a nozzle 100 of the liner 28, with the orifice 98 being in fluid communication with the chamber 34. In block 204 a vacuum is applied to the chamber 34 that may generally bias the liner 28 against the granulated material 96. When so biased, any flow or shifting of the granulated material 96 is prevented, at least in part, due to the forces each granulate exerts against the next adjacent granulate. In addition, shifting between granulates may be minimized based on the shape of the granulates themselves (e.g., not rounded and/or irregular in shape). In block 206, the orifice 98 may be sealed or plugged with, for example, a removable plug 102. In block 208, once the liner chamber 34 under a vacuum is sealed, the liner 28 may be removed from the fixture 94. With the chamber 34 filled with the granulated material 96 and under a vacuum, the liner may be removed from the fixture 94 while maintaining the intended shape/contour mimicked by the fixture 94.

In block 210, the liner 28 may be enveloped with the inner layer 84. The added weight and/or stress produced against the liner 28 while adding layer 84 will not generally deform the liner due to the added support provided by the granulated material 96. The size (e.g., diameter) of each granulate of the granulated material 96 may be determined by the liner wall thickness and/or strength, the amount of vacuum applied, and any allowable tolerances/deviations from the intended liner shape. In block 212, the inner layer 84 (e.g., resin impregnated composite material) may be cured. With the layer 84 adhered to the outside surfaces of the liner 28, the layer 84 may provide the structural strength needed to maintain the intended shape of the liner. In block 214, the plug 102 may be removed thus releasing the vacuum and the granulated material 96 may be removed and/or poured out through the nozzle 100.

In one embodiment, removal of the granulated material 96 may be accomplished by first dissolving the granulated material in a liquid solvent. For example, the granulated material 96 may be salt and the liquid—may be water. Alternatively, it is contemplated that the granulated material 96 may not be removed, and instead, may serve the dual purpose of acting as a gas absorbent (i.e., absorbs the gas intended for storage). In another embodiment, the manufacturing process may not require use of the fixture 94 if the liner 28 (i.e., on its own) is of sufficient strength and/or of a particular shape such that any features or contours of the liner 28 are not prone to overexpansion when the liner 28 is filled with the granulated material 96. In such applications (i.e., with no fixture) the granulated material 96 may be made of a material that is relatively light (e.g., hollow glass spheres), yet of sufficient strength to substantially resist the biasing force of the liner 28 when placed under a vacuum. In such a case, the application of a vacuum may not be needed if the liner can maintain its shape. It is further contemplated and understood that the manufacturing process may not require the actual use of a plug and/or nozzle, and may instead utilize any known process of placing a chamber under a vacuum and sealing the wall that defines the chamber, so the vacuum is not relieved.

Figure 9:
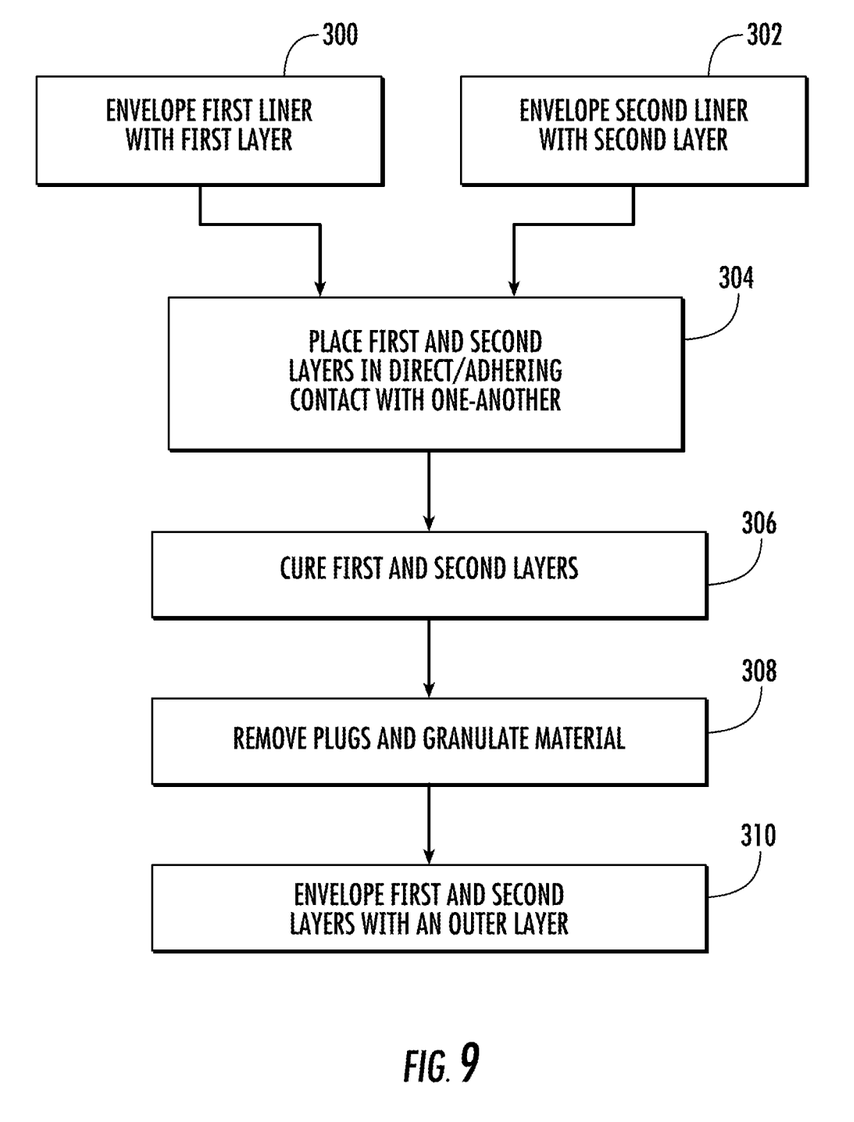
FIG. 9 is a second embodiment of the method of manufacturing when the vessel assembly includes two liners.

Referring to FIG. 9, in an example where manufacturing of the vessel assembly 20 includes two or more vessels with, for example, liners 28, 32, a similar method to that previously described for a single liner may be applied but with an additional step. More specifically, in block 300 and block 302, the respective liners 28, 30 being filled with a granulated material and under a vacuum may be individually enveloped with the respective inner layers 84, 88. Prior to curing of the layers 84, 88 and in block 304, the layers may be placed in direct, side-by-side, contact with one-another. In block 306, the inner layers 84, 88 (e.g., resin impregnated composite material) may be cured thus adhering the inner layers together. In block 308, the liners 84, 88 may be unplugged thus relieving the respective vacuums and the granulate material removed from each liner. In block 310, the third layer 90 may be added over both of the inner layers 84, 88 thus enveloping the inner layers and adding further strength to the vessel assembly 20.

Figure 10:
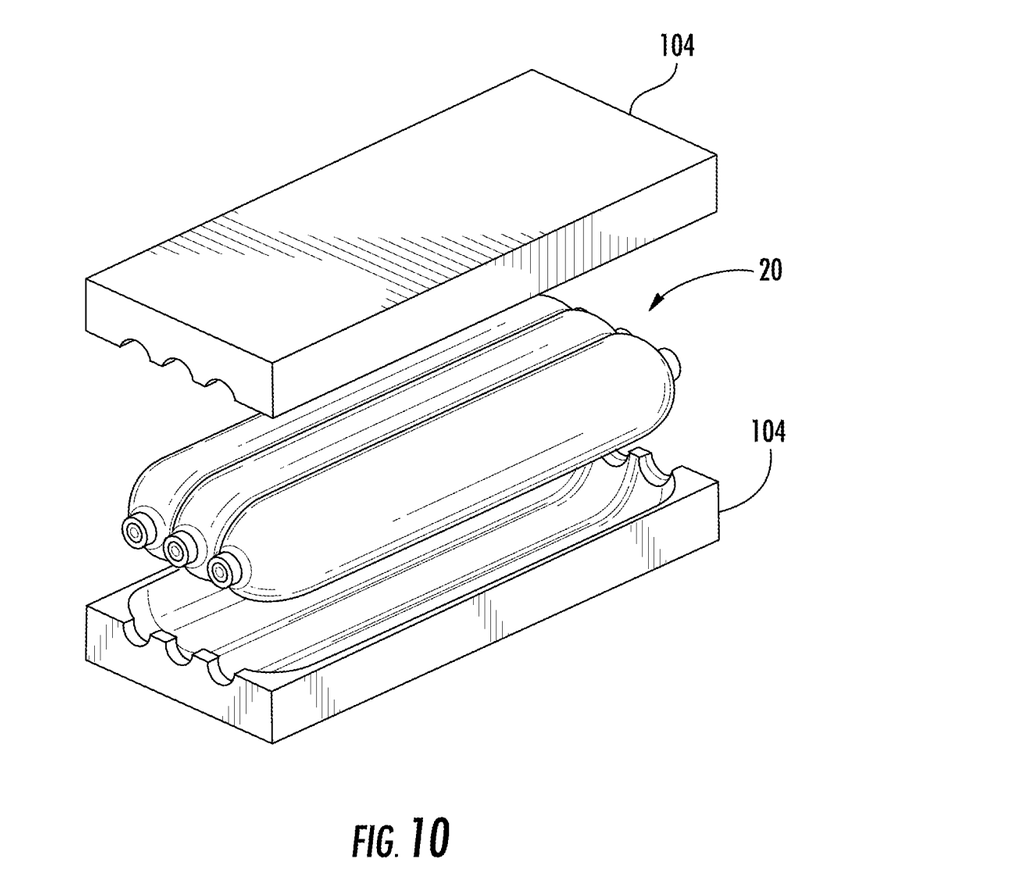
FIG. 10 is a perspective view of the vessel assembly in conjunction with a pre-formed curing mold.

Referring to FIG. 10, after the outer layer 90 is applied, the composite vessel assembly 20 may be placed in a pre-formed pressure mold 104. Once in place, the chambers 40, 42, 44 defined by the respective liners 28, 30, 32 may be pressurized and the resins of the inner and outer layers 84, 86, 88, 90 allowed to cure under heat. It is further contemplated and understood that other curing methods for the outer layer 90 may be applied such as, for example, an autoclave or oven.

The composite vessel assembly 20 may provide a lightweight storage tank(s) with a high energy storage density. The approach enables the easy addition of reinforcing composite material and a stitching component 100 where needed (e.g. junctions 92). The use of the hybrid continuous and short fiber may further minimize the vessel assembly weight. Because the vessel assembly 20 is in a non-cylindrical shape, the assembly will provide the highest conformability to a given space. Moreover, the composite construction will also provide corrosion resistance compared to metallic tanks.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of manufacturing a composite vessel assembly comprising: placing a first liner in a first pre-form fixture prior to filling with a first granulated material; filling a first chamber defined by the first liner with the first granulated material through a first orifice in the first liner; applying a vacuum to the first chamber; plugging the first orifice; enveloping the first liner with a first layer for structural rigidity, wherein the first liner lines and is in contact with the first layer, and wherein the first liner is flexible and collapsible without the first layer; curing the first layer before relieving the vacuum from the first chamber; and relieving the vacuum, wherein the first layer adheres to an outer layer of the first liner and maintains a shape of the first liner after the vacuum is relieved, wherein the first layer becomes structurally rigid before relieving the vacuum from the first chamber within the first liner, and wherein the composite vessel is configured to store a pressurized fluid in a cavity formed by an interior surface of the first liner after curing.

2. The method of manufacturing set forth in claim 1, wherein the vacuum is relieved through the first orifice by unplugging the first orifice.

3. The method of manufacturing set forth in claim 1 further comprising: removing the first liner from the first pre-form fixture before enveloping the liner with the first layer.

4. The method of manufacturing set forth in claim 1, wherein the first layer is a composite layer.

5. The method of manufacturing set forth in claim 2 further comprising:
removing the first granulated material through the first orifice.

6. The method of manufacturing set forth in claim 5, wherein removing the first granulated material is performed by dissolving the first granulated material.

7. The method of manufacturing set forth in claim 1, wherein the first liner is made of a polymer and the first layer is made of a resin impregnated fiber-based material.

8. The method of manufacturing set forth in claim 1, wherein the first granulated material is a gas absorbent material.

9. The method of manufacturing set forth in claim 1 further comprising:
filling a second chamber defined by a second liner with a second granulated material through a second orifice in the second liner;
applying a vacuum to the second chamber;
plugging the second orifice;
enveloping the second liner with a second layer for structural rigidity;
relieving the vacuum; and
enveloping the first and second layers with a third layer.

10. The method of manufacturing set forth in claim 9, wherein a portion of the first and second layers are placed in direct contact with one-another before the first and second layers are enveloped by a third layer.

11. The method of manufacturing set forth in claim 9 further comprising:
placing the second liner in a second pre-form fixture prior to filling with the second granulated material.

12. The method of manufacturing set forth in claim 11 further comprising:
removing the second liner from the second pre-form fixture before enveloping with the second layer.

13. The method of manufacturing set forth in claim 10, wherein the first and second layers are made of a resin-based composite material.

14. The method of manufacturing set forth in claim 13, wherein the first and second layers are enveloped by the third layer be fore the first and second layers are cured.

15. The method of manufacturing set forth in claim 14, wherein the third layer is a resin-based composite material.

16. The method of manufacturing set forth in claim 15 further comprising:
   removing the first and second granulated materials through the respective first and second orifices.

17. A method of manufacturing a composite vessel assembly comprising: placing a liner in a first pre-form fixture prior to filling with a first granulated material; filling a first chamber defined by liner with granulated material through an orifice in the liner; applying a vacuum to the first chamber; plugging the orifice; enveloping the liner with a layer for structural rigidity, wherein the liner lines and is in contact with the layer, wherein the liner is flexible and collapsible without the layer; curing the layers before relieving the vacuum from the first chamber; and relieving the vacuum, wherein the layer adheres to an outer layer of the liner, and the layer becomes structurally rigid and maintains a shape of the liner, and wherein the composite vessel is configured to store a pressurized fluid in a cavity formed by an interior surface of the liner after curing.

* * * * *